US008789707B2

(12) United States Patent
Robertson

(10) Patent No.: US 8,789,707 B2
(45) Date of Patent: Jul. 29, 2014

(54) SIFTING SCREEN

(75) Inventor: Graham Robertson, Edinburgh (GB)

(73) Assignee: United Wire Limited (GB)

( * ) Notice: Subject to any disclaimer, the term of this patent is extended or adjusted under 35 U.S.C. 154(b) by 179 days.

(21) Appl. No.: 13/131,455

(22) PCT Filed: Dec. 14, 2009

(86) PCT No.: PCT/GB2009/051708
§ 371 (c)(1), (2), (4) Date: Jul. 14, 2011

(87) PCT Pub. No.: WO2010/073028
PCT Pub. Date: Jul. 1, 2010

(65) Prior Publication Data

US 2011/0259814 A1 Oct. 27, 2011

(30) Foreign Application Priority Data

Dec. 23, 2008 (GB) .................................. 0823402.3
Jun. 10, 2009 (GB) .................................. 0909950.8

(51) Int. Cl.
*B01D 39/10* (2006.01)
*B01D 33/03* (2006.01)
*B07B 1/46* (2006.01)

(52) U.S. Cl.
CPC ............. *B07B 1/4618* (2013.01); *B07B 1/4636* (2013.01); *B07B 1/4645* (2013.01); *B07B 1/4663* (2013.01); *B07B 1/469* (2013.01)
USPC ........... 210/499; 209/366; 209/392; 209/397; 209/408; 209/409; 209/412; 210/384

(58) Field of Classification Search
CPC .. B07B 1/4618; B07B 1/4636; B07B 1/4645; B07B 1/4663; B07B 1/469
See application file for complete search history.

(56) References Cited

U.S. PATENT DOCUMENTS

| | | | | |
|---|---|---|---|---|
| 2,870,910 | A * | 1/1959 | Welmer | 209/396 |
| 4,563,270 | A * | 1/1986 | Wolff | 209/379 |
| 2005/0236305 | A1 | 10/2005 | Schulte, Jr. et al. | |
| 2006/0096895 | A1 | 5/2006 | Reid-Robertson et al. | |
| 2007/0175802 | A1 | 8/2007 | Johnson et al. | |
| 2007/0221547 | A1 | 9/2007 | Robertson | |
| 2008/0078702 | A1 | 4/2008 | Carr et al. | |
| 2009/0071879 | A1 | 3/2009 | Helmy | |
| 2009/0139909 | A1 | 6/2009 | Robertson | |

FOREIGN PATENT DOCUMENTS

| | | |
|---|---|---|
| EP | 1444056 B | 6/2005 |
| GB | 2421206 | 6/2006 |
| WO | WO03/057376 | 7/2003 |
| WO | WO2004/048007 | 6/2004 |

* cited by examiner

*Primary Examiner* — Benjamin Kurtz
(74) *Attorney, Agent, or Firm* — Barnes & Thornburg LLP

(57) ABSTRACT

There is provided a screen frame adapted for use in a shaker to separate solids from liquid/solid mixture and to which woven wire mesh is to be attached, comprising a plurality of intersecting elongate members (12) defining a plurality of openings (10), or cells, wherein at least one protrusion (26) in the form of an elongate rib extends partway across each opening (10).

9 Claims, 4 Drawing Sheets

| | 1 | 2 | 2.1 | 2.2 | 2.3 | 3 |
|---|---|---|---|---|---|---|
| stress | 0.028 | 0.047 | 0.037 | 0.022 | 0.014 | 0.114 |

| | 1 | 2 | 2.1 | 2.2 | 2.3 | 3 |
|---|---|---|---|---|---|---|
| deflection (mm) | 0.00002 | 0.00009 | 0.00006 | 0.00001 | 0.00000 | 0.00041 |

SIFTING SCREEN

RELATED APPLICATIONS

This patent application is a U.S. nationalization under 35 USC §371 of International Application No. PCT/GB2009/051708, filed Dec. 14, 2009, which claims priority to Great Britain Patent Application No. 0909950.8, filed Jun. 10, 2009 and Great Britain Patent Application No. 0823402.3, filed Dec. 23, 2008. The disclosures set forth in the referenced applications are incorporated herein by reference in their entireties.

FIELD OF INVENTION

This invention relates to sifting screens which in use are fitted to a shaker to separate solids from liquids and in particular to separate solids from liquid drilling muds brought up from downhole when drilling for oil or gas.

BACKGROUND TO THE INVENTION

Sifting screens used to remove debris such as rock and shale from synthetic drilling muds incorporate layers of woven wire mesh to separate out the debris from the synthetic mud. The screen is vibrated within the shaker and the mesh is subjected to wear from the vibration and the mud and debris. Replacing individual screens as the mesh fails is time consuming and delays the recovery of the mud. To improve the period of time over which any given screen remains operational, the screen is typically divided up into any number of rectangular openings or cells to which the mesh is bonded. If mesh over a given cell fails, this cell can be blocked off leaving the remainder of the screen functioning. This allows the operational life of the screen to be extended, with failure of mesh in one area not compromising the integrity of the remainder of the mesh.

The useful life of the screen needs to be as long as possible. The weight of the screen, the size of the cells and the exposed area of mesh all affect how much drilling mud can be recovered over a given time before the screen needs to be replaced in its entirety.

SUMMARY OF THE INVENTION

The present invention relates to a screen frame adapted for use in a shaker to separate solids from liquid/solid mixture and to which woven wire mesh is to be attached, comprising a plurality of intersecting elongate members defining a plurality of openings, or cells, wherein at least one protrusion extends partway across at least one opening, thereby to support mesh when attached. In use mesh covering the opening is supported by the protrusion within the area defined by the opening. This reduces stress on the mesh so reducing the rate at which it wears and improving the operational life of the mesh. Whilst prior art screens have used integral partial ribs to subdivide the openings and so support the mesh, these screens have suffered from warping during manufacture as typically they are made from moulded plastics materials and when the moulded screen cools, the subdividing ribs differentially contract to the remainder of the screen, so causing warping. By having a protrusion which extends partway across the opening, and is thus free at one end, warping is avoided, whilst still providing additional support to reduce wear.

Typically at least one protrusion will extend partway across each opening, so that in use the mesh covering each opening or cell is provided with additional support.

Preferably the protrusions are integrally formed with the intersecting elongate members so as to cantilever from those members when extending partway across the opening. Each protrusion thus has an end secured to and extending from part of an elongate member and a free end.

To provide additional support, two or more protrusions extending partway across each opening may be provided.

As will be appreciated, various geometric arrangements can be employed, such that protrusions may extend from one side of an opening, may extend from opposing sides or adjacent sides. One protrusion extending from opposing sides of each opening, such that there are two protrusions for each opening, has been found particularly beneficial, but more protrusions may be provided bearing in mind the requirement that the opening needs to have a substantial free area to sift drilling mud.

Desirably protrusions will be positionally staggered to support the mesh at spaced apart locations within the cell. If the protrusions extend from opposing sides of an opening, the length of the protrusions is selected to ensure they are separated by a small gap as otherwise warping may occur during manufacture.

Where protrusions are provided on opposing sides of an opening, typically each protrusion extends at least halfway across the opening, and is thus at least length L/2 where L is the length of a wall of the opening parallel to the protrusion.

The protrusions are preferably elongate fingers or ribs, with typically a common shape used throughout the frame. However protrusions in the form of partial ovals, partial circles or comb-like structures may be used.

The invention will now be described, by way of example, with reference to the accompanying drawings, in which.

DESCRIPTION

Figure 1:
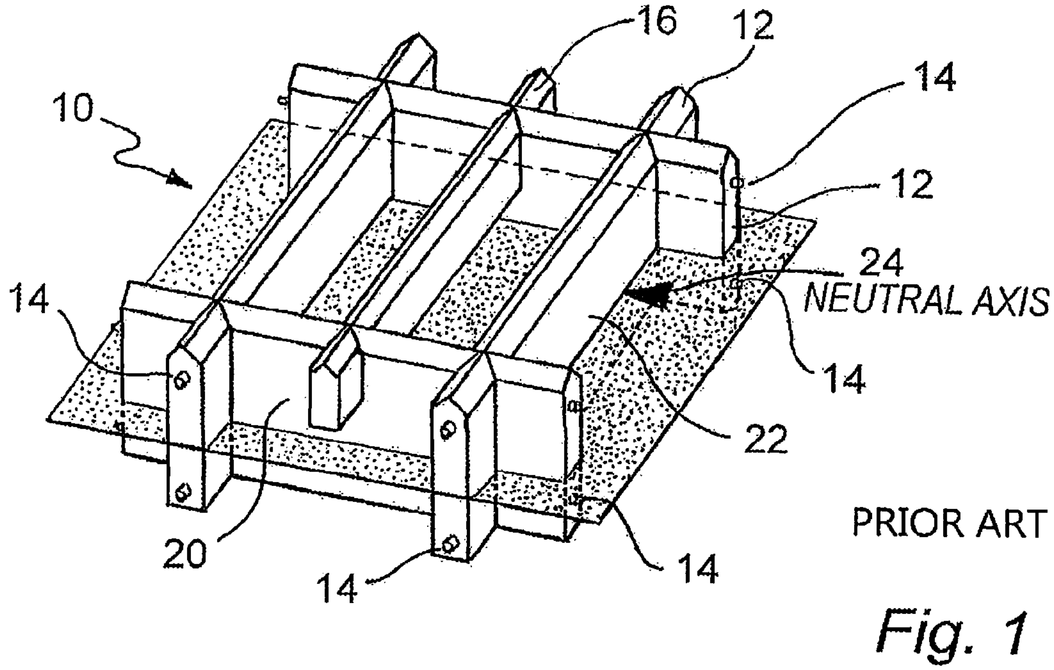
FIG. 1 is a perspective view of an opening or cell, being one of a plurality of such cells within a prior art sifting screen.

FIG. 1 shows in detail one opening or cell 10 of a prior art sifting screen, the general type of which is disclosed in EP 1444056 where the screen comprises a rectangular frame within which a grid of intersecting elongate ribs 12 reinforced by a grid of steel wires 14 divides the filtering area into an orthogonal array of openings or cells 10. Such screens are made by a plastics moulding process with mesh stretched over and secured to the frame so that each opening or cell is associated with an area of mesh.

To extend the life of the mesh covering each cell 10, it is known to sub-divide the cell 10 with a thin rib 16 which is half the depth of the main ribs 12, rib 16 halving the short span of the cell associated with a shortest wall 20. The half-depth rib 16 spans the top of the walls 20 and supports mesh covering that particular cell 10, so reducing the load stress associated with the mesh by a factor of approximately 6 and improving the wear characteristics of the mesh. However difficulties can arise with the moulding of such screens. During moulding, GRP plastics material is injected at high temperature (approximately 250° C.) into a mould of the frame. Upon cooling the plastics material contracts, with this contraction resisted by the steel reinforcing wires 14. However the thinner half-depth ribs 16 do not have any reinforcement and are free to contract. As they are above the neutral axis 24 of the frame, this shrinkage tends to make the frame warp.

Figure 2:
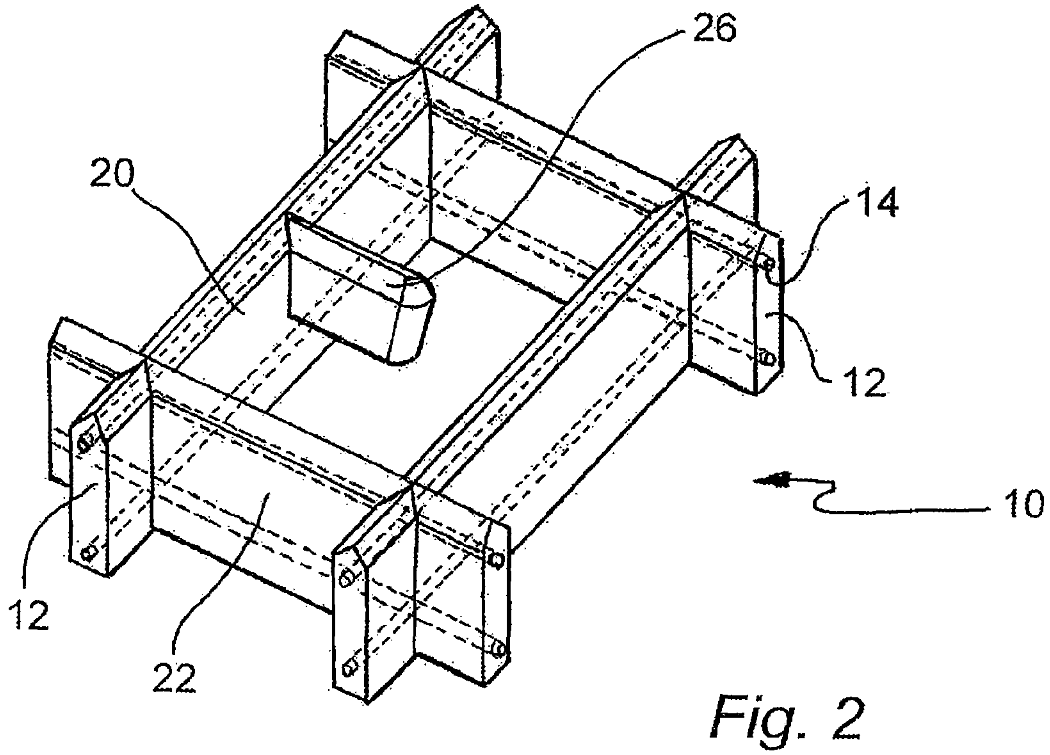
FIG. 2 is a perspective view of an opening or cell in accordance with one embodiment of the present invention which incorporates a truncated rib.
Figure 3:
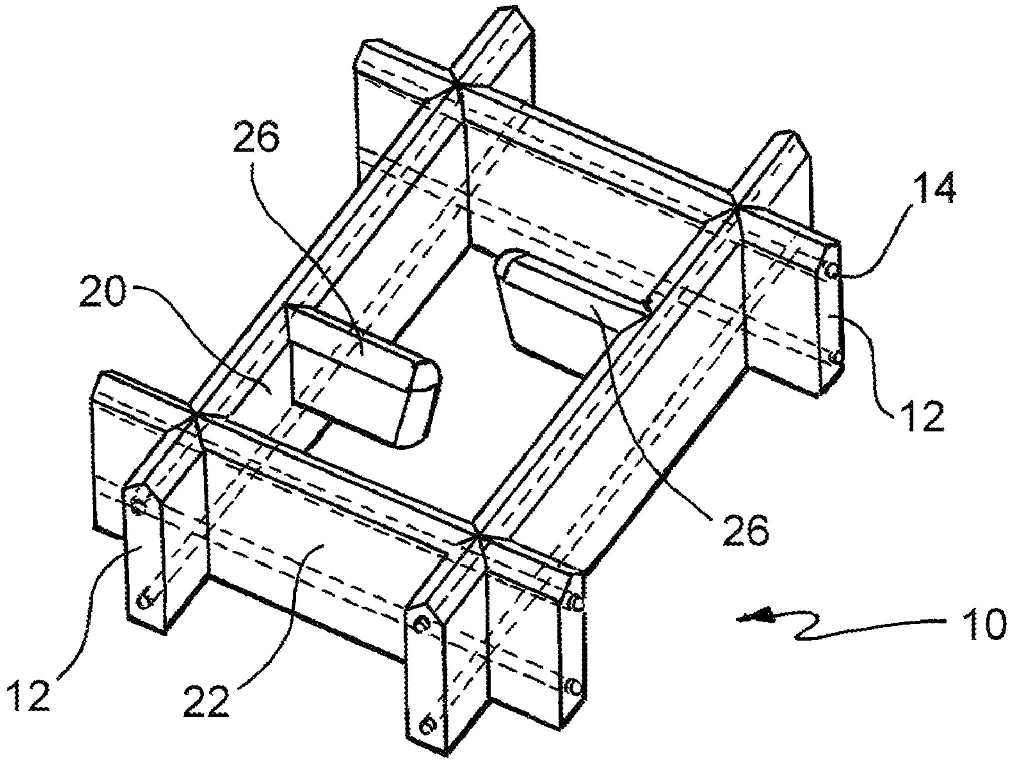
FIG. 3 is a perspective view of an opening or cell within a sifting screen in accordance with a second embodiment of the present invention.

FIGS. 2 and 3 show embodiments of sifting screens in accordance with the present invention with, as for FIG. 1, only one cell shown in detail. Generally all cells within the screen will be identical with a regular array of cells comprising the screen.

In FIG. 2, a truncated rib 26 integrally moulded with rib 12 cantilevers from the short wall 20 of the cell, extending partway across the cell 10 parallel to a longer wall 22. The partial or truncated rib 26 is approximately half the depth of the main reinforced wall 20 of rib 12 with the uppermost part of the rib 26 being in the same plane as the uppermost part of the short and long walls 20, 22. The truncated rib 26 extends at least halfway across the cell, and thus has a length of at least half L/2, where L is the length of the long side 22. When moulding takes place, the truncated rib 26 is free to contract and shrink back on itself without pulling on the wall on the other side of the cell, and so the tendency for the frame to warp is avoided. In use, the mesh carried on the frame is supported by the truncated rib 26 within the area defined by the cell.

Other arrangements of partial ribs are possible and FIG. 3 shows another arrangement with partial ribs formed respectively at approximately ⅓ of the way up and down the short walls 20 in opposing short walls of the cell. These ribs extend halfway across the span of the cell, although if desired can extend more than halfway across the span. Such an arrangement reduces the stress in the wire cloth by a factor of 6, so improving wear characteristics.

Figure 4:
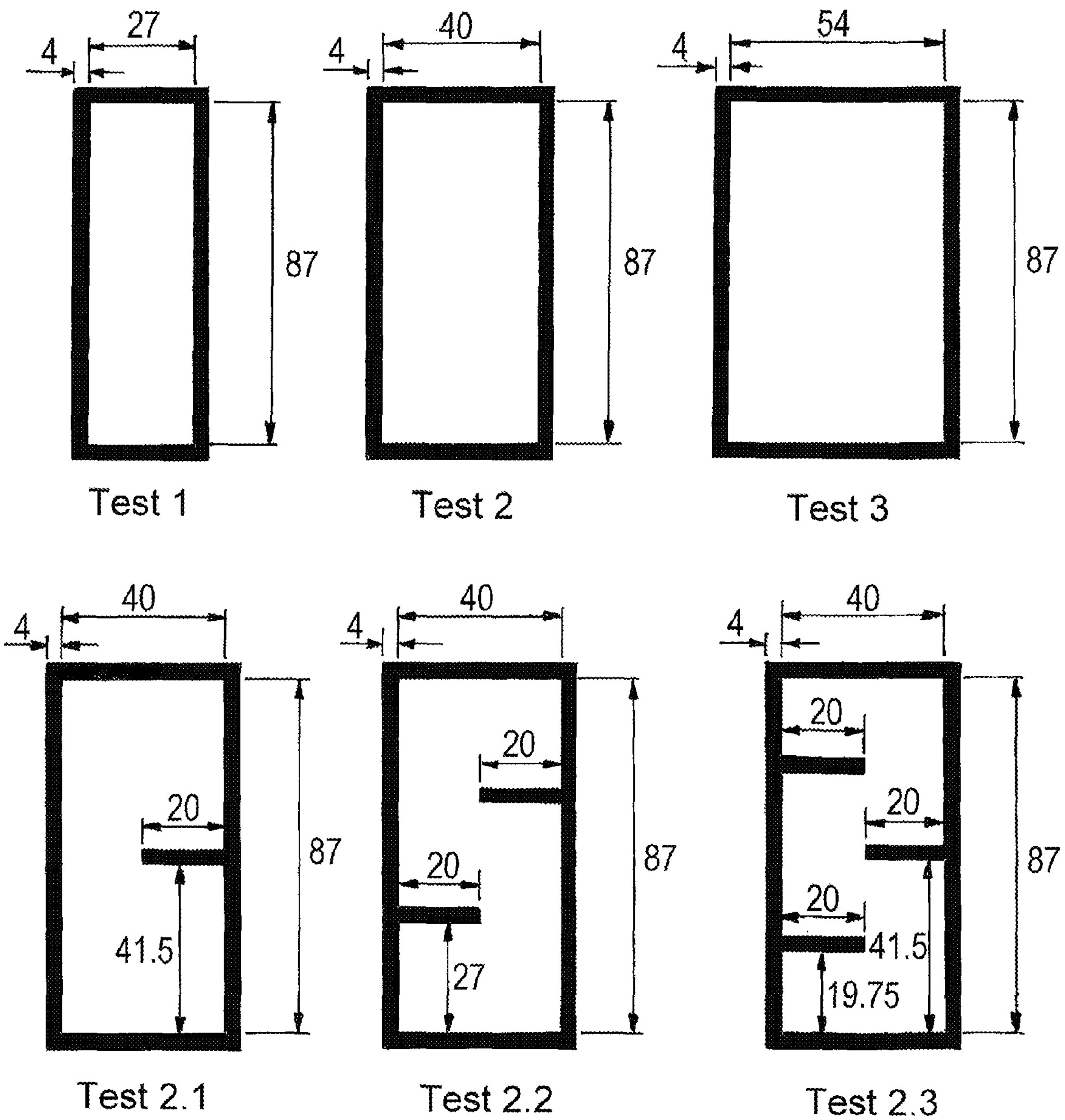
FIGS. 4 to 6 relate to modelling tests carried out in relation to cells of different dimensions and with different combinations of truncated ribs.

Analysis was undertaken in ANSYS Workbench modelling software to determine how the stress and deflection in the wire cloth varies with cell size and different configurations of partial ribs. Six different test cell structures, 1, 2, 3, 2.1, 2.2 and 2.3 as shown in FIG. 4, were generated in solid edge with the wire cloth idealised as a thin solid with a thickness of 0.25 mm. The black zone represents the wire cloth polymer bond which was supported rigidly in the finite element model. 1, 2 and 3 are rectangular cells with a common mesh length of 87 mm and varying mesh width with a mesh width of 27 mm for 1, 40 mm for 2 and 54 mm for 3. 2.1, 2.2 and 2.3 are cells of the same dimensions as 2, namely mesh length of 87 mm and cell width of 40 mm, but with one, two or three protruding ribs respectively.

When modelling, a load of 1 g was applied to each cell model so that the unsupported material of the wire cloth was accelerated relative to the rigidly supported structure. This gave results as summarised in Table 1 below and shown in FIG. 5 which is a graph showing stress for each cell, and FIG. 6 which is a graph showing deflection for each cell.

TABLE 1

Stress and deflection under a 1 g load

| Open area ($mm^2$) | Definition | Test | Stress (MPa) | Deflection (mm) |
|---|---|---|---|---|
| 2349 | 27 × 87 | 1 | 0.028 | 0.00002380 |
| 3480 | 40 × 87 | 2 | 0.047 | 0.00009370 |
| 3480 | 40 × 87 1 arm | 2.1 | 0.037 | 0.00006500 |
| 3320 | 41 × 87 2 arm | 2.2 | 0.022 | 0.00001470 |
| 3300 | 42 × 87 3 arm | 2.3 | 0.014 | 0.00000695 |
| 4698 | 54 × 87 | 3 | 0.114 | 0.00041390 |

Figure 5:
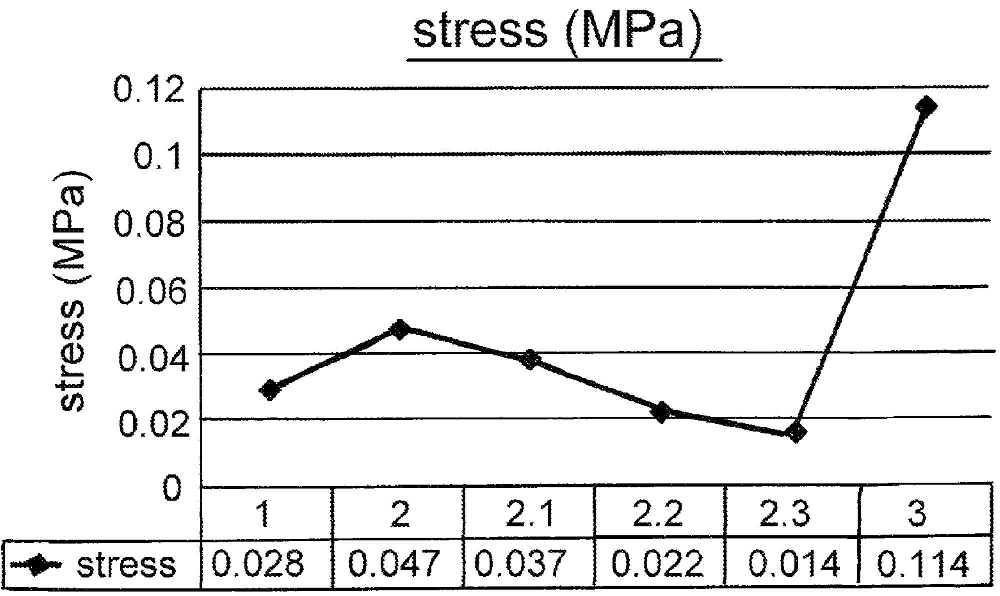
Figure 6:
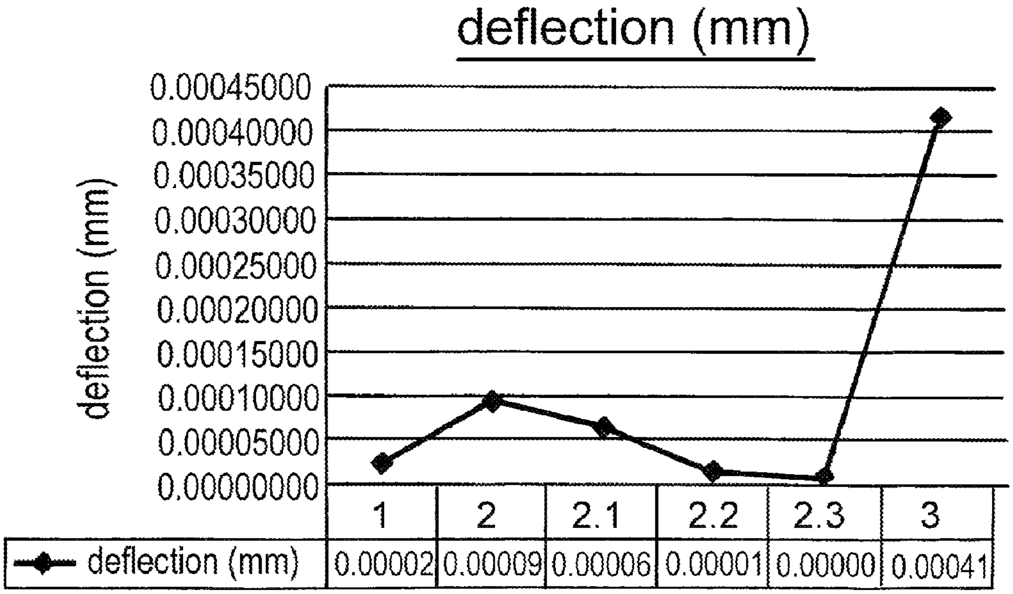

As can be seen from FIGS. 5 and 6, generally as the unreinforced cell size increases (cells 1, 2 and 3), the stress/deflection increases. As stress and deflection increase, wear of the mesh increases and cell life decreases.

Where, for a given cell size, protruding ribs are incorporated into the cell structure, see 2, 2.1, 2.2 and 2.3, the stress and deflection decrease as the number of ribs increases from zero to three. It can thus be seen that reinforcing the cell with partial ribs offsets the disadvantage of increasing the cell size, and for a given cell size, the cell life increases as partial ribs are added. The benefit in adding partial ribs can be seen to level off from 2 partial ribs to 3 partial ribs, so moving to four partial ribs will be less beneficial, especially when considering the blocking effect of the ribs on mud flow through the screen.

As stress and deflection decrease, so the cell life increases. Comparing test 2.2 with test 1, 2.2 experiences less stress and deflection for a similar percentage of open mesh versus blanked off area (test 1 has 83.3% open mesh, test 2.2 82.9%). Test 2.3 experiences even less stress and deflection but the amount of usable open mesh (80.9%) is reduced. The more partial ribs added, the more mesh that is blocked, reducing the flow rate through the sieve.

The modelling results confirm that an increase in cell life is achievable by local cell reinforcement with partial ribs. The optimal number of partial ribs per cell is probably two, since the benefits of additional ribs in terms of reduced stress and deflection tend to be outweighed by the reduced usable mesh area available for increasing numbers of partial ribs.

The invention claimed is:

1. A screen frame adapted for use in a shaker to separate solids from liquid/solid mixture and to which woven wire mesh is attached, comprising a plurality of intersecting elongate members defining a plurality of openings, or cells, wherein at least one protrusion extends from part of an elongate member partway across at least one opening.

2. A screen frame according to claim 1, wherein at least one protrusion extends partway across each opening.

3. A screen frame according to claim 1, wherein the protrusions are integrally formed with the intersecting elongate members so as to cantilever from those members.

4. A screen frame according to claim 1, wherein two or more protrusions extend partway across each opening.

5. A screen frame according to claim 4, wherein the protrusions are positionally staggered, thereby in use to support mesh at spaced apart locations with the opening.

6. A screen frame according to claim 1, wherein protrusion(s) extend from one side, or from opposing sides or from adjacent sides of an opening.

7. A screen frame according to claim 1, wherein one protrusion extends from opposing sides of each opening, such that there are two protrusions for each opening.

8. A screen frame according to claim 4, wherein each protrusion extends at least halfway across the opening.

9. A screen frame according to claim 1, wherein the protrusion(s) are elongate fingers or ribs.

* * * * *